No. 646,576. Patented Apr. 3, 1900.
L. W. & G. W. GREENLEAF.
MORTISING MACHINE.
(Application filed Sept. 20, 1899.)

(No Model.) 3 Sheets—Sheet 1.

WITNESSES
INVENTORS
Latham W. Greenleaf, and
George W. Greenleaf
by Herbert W. T. Jenner.
Attorney No. 646,576. Patented Apr. 3, 1900.
L. W. & G. W. GREENLEAF.
MORTISING MACHINE.
(Application filed Sept. 20, 1899.)
(No Model.) 3 Sheets—Sheet 2.

WITNESSES
INVENTORS
Latham W. Greenleaf and
George W. Greenleaf
by Herbert W. T. Jenner.
Attorney No. 646,576. Patented Apr. 3, 1900.
L. W. & G. W. GREENLEAF.
MORTISING MACHINE.
(Application filed Sept. 20, 1899.)
(No Model.) 3 Sheets—Sheet 3.
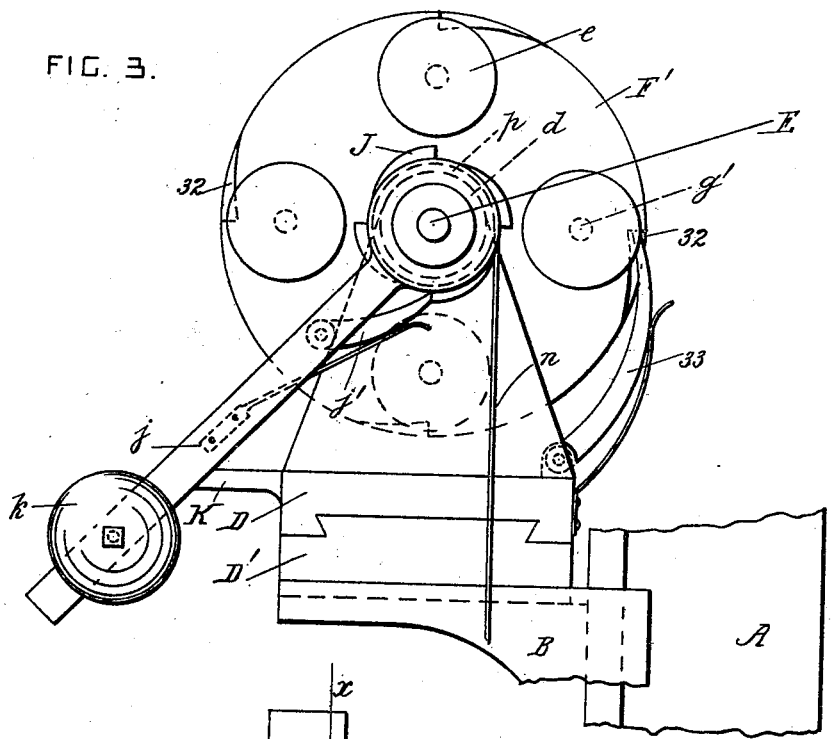
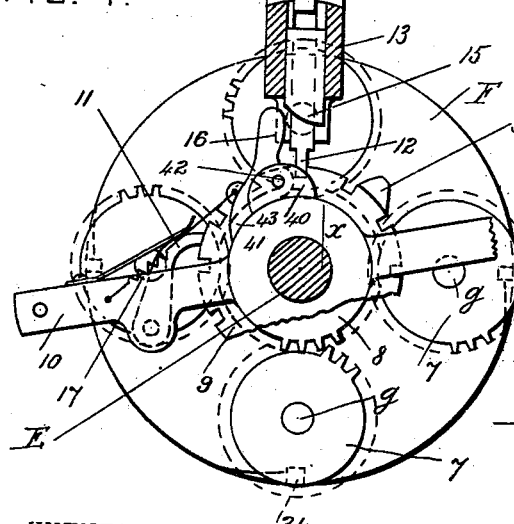
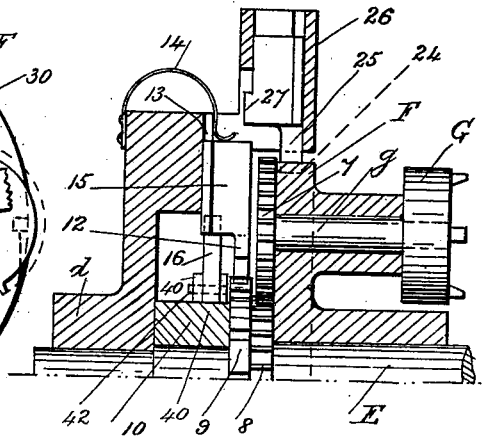
WITNESSES
INVENTORS
Latham W. Greenleaf and
George W. Greenleaf
by Herbert W. T. Jenner
Attorney

UNITED STATES PATENT OFFICE.

LATHAM W. GREENLEAF AND GEORGE W. GREENLEAF, OF TERRE HAUTE, INDIANA.

MORTISING-MACHINE.

SPECIFICATION forming part of Letters Patent No. 646,576, dated April 3, 1900.

Application filed September 20, 1899. Serial No. 731,093. (No model.)

*To all whom it may concern:*

Be it known that we, LATHAM W. GREENLEAF and GEORGE W. GREENLEAF, citizens of the United States, residing at Terre Haute, in the county of Vigo and State of Indiana, have invented certain new and useful Improvements in Mortising-Machines; and we do hereby declare the following to be a full, clear, and exact description of the invention, such as will enable others skilled in the art to which it appertains to make and use the same.

This invention relates to mortising-machines for wheel-hubs; and it consists in the novel construction and combination of the parts hereinafter fully described and claimed.

Figure 1:
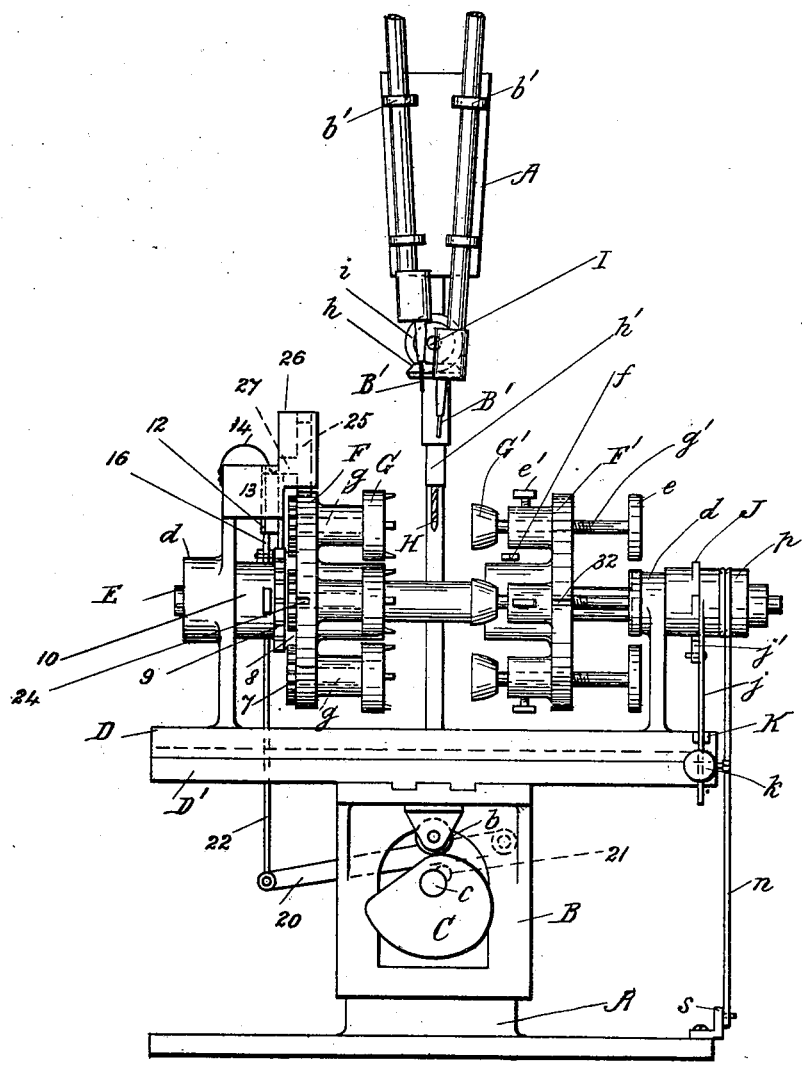
Figure 2:
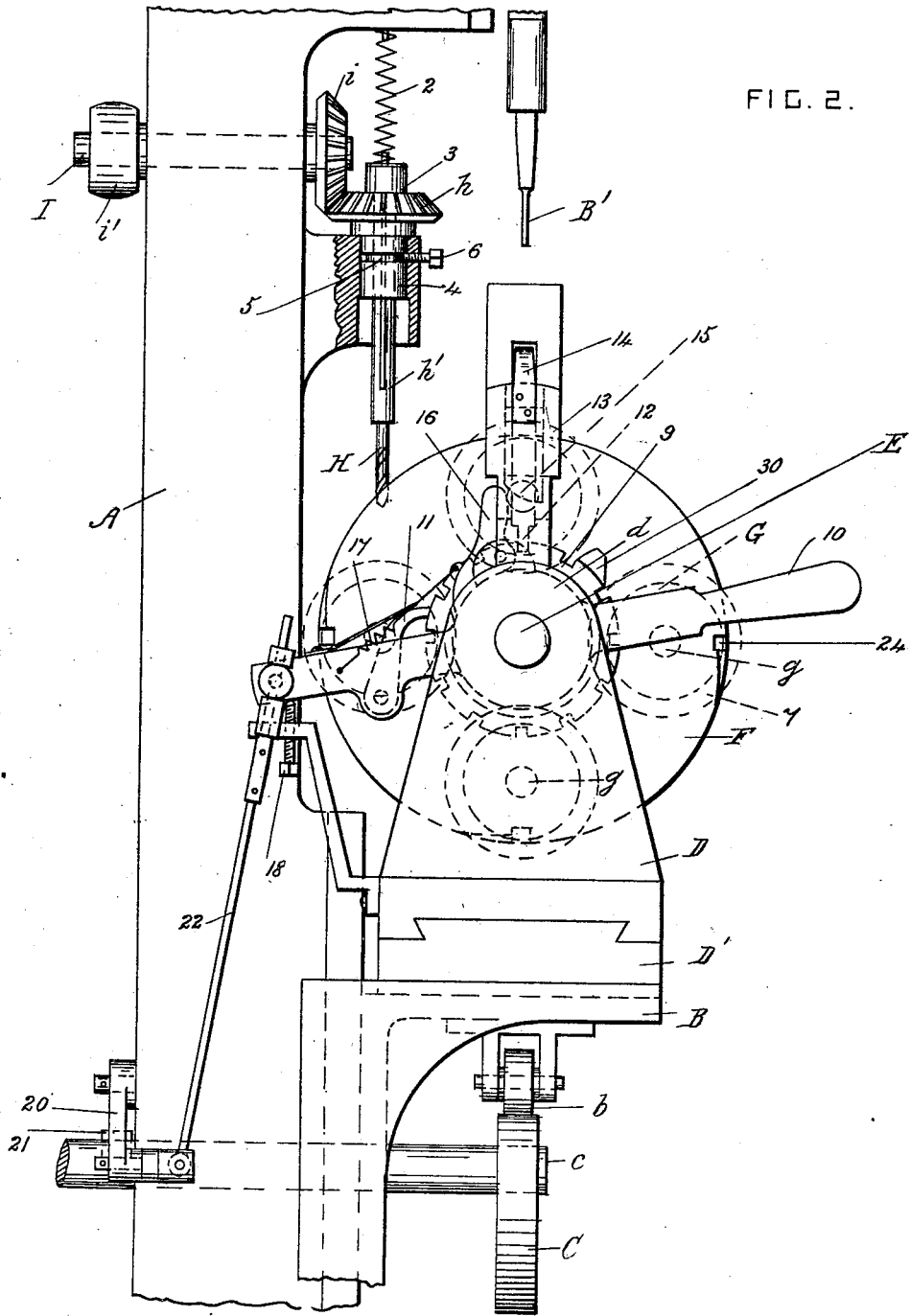

In the drawings, Figure 1 is a front view of the lower part of a mortising-machine constructed according to this invention. Fig. 2 is a side view of the parts shown in Fig. 1, and Fig. 3 is a side view looking in the opposite direction from the view shown in Fig. 2. Fig. 4 is a detail view of the means for revolving the hub-supports. Fig. 5 is a section taken partly on line $x$ $x$ in Fig. 4.

A is a portion of the stationary frame of a mortising-machine.

B is a saddle which slides vertically upon guides on the frame A and which has a roller $b$ on its under side.

C is a cam secured on a driving-shaft $c$ under the roller $b$ and which operates to raise the saddle periodically. The shaft $c$ is revolved by any approved driving devices. (Not shown.)

B' are the reciprocating cutting-chisels, which are slidable in guides $b'$ above the saddle B. The mechanism for reciprocating the cutting-chisels is not shown, as it is of any approved construction.

D is a bracket or frame which rests on a table D', which is supported by the saddle B. The saddle, table, and bracket are connected together in any approved manner and preferably so as to be adjustable in a horizontal plane.

E is a shaft which is journaled in bearings $d$ on the bracket D. Two plates or disks F and F' are secured on the shaft E, and the disk F' is adjustable longitudinally on the shaft, so that hubs of widely-different size can be inserted between the disks. A set-screw $f$ or other fastening device is provided for securing the adjustable disk to the shaft. The disks are provided with a series of revoluble supports for the hubs arranged equidistant from the shaft about which they gyrate, four supports preferably being provided. These supports are of any approved construction and preferably consist of chucks G, provided with shafts $g$, and cups G', carried by spindles $g'$. The shafts $g$ are journaled in the disk F, and the chucks engage with the hubs at one end. The cups G' engage with the other end of the hubs, and their spindles are carried by the disk F'. The cups are retractible by means of their spindles, which are screw-threaded and which are of any approved construction for centering work. Setscrews $e'$ are provided for securing the spindles, and $e$ are knobs on the ends of the spindles for revolving them. The hubs to be mortised are supported by the said supports, and the shaft E is preferably arranged vertically under the cutting-chisels, so that the chisels operate on the upper hub.

H is a boring-bit supported behind the shaft E over the center of the rear hub. The boring-bit is revolved continuously by any approved driving mechanism. A beveled toothed driving-wheel $h$ is splined on the shaft $h'$ of the boring-bit, and $i$ is a beveled toothed wheel which gears into the wheel $h$. The wheel $i$ is secured on a shaft I, which is journaled in a bearing in the frame A and is driven by a belt-pulley $i'$. When the saddle is raised by the cam, the hub under the boring-bit is raised, so that a hole is bored in it. The shaft E is subsequently revolved a quarter of a revolution, so that the bored hub comes under the chisels, and the mortise is cut by the chisels in the usual manner as an extension of the said hole. A single cutting-chisel might be used, but it is preferable to use a pair of them. The axis of the boring-bit is arranged substantially parallel with the axis of the cutting chisels or chisel.

In case the boring-bit should not work properly and fail to bore—as, for instance, if the driving-belt were to slip on the pulley $i'$—the shaft $h'$ of the boring-bit is not rigidly secured to its driving-wheel. A spring 2 is provided which presses the shaft $h'$ downward, a stop 3 being provided to prevent the shaft from being pushed too far down.

The driving-wheel $h$ is provided with a hub 4, which is journaled in a bearing on the frame and provided with a circumferential groove 5. A pin 6 engages with the groove 5, so that the driving-wheel is free to revolve, but cannot move vertically. The spring is arranged between the shaft $h'$ and the frame or in any other approved manner, so that when the boring-bit fails to revolve or bore it is pushed upward by the hub against the pressure of the spring 2, and the machine is not strained or broken in any way.

In order that the supports for the hubs may be revolved upon their axes, each shaft $g$ has a toothed wheel 7 secured on it, and 8 is a toothed wheel which is journaled on the shaft E and gears into all the wheels 7. A notched spacing-wheel 9 is secured to the wheel 8 and is preferably removable, so that spacing-wheels with a different number of notches can be used, according to the number of mortises to be cut into each hub. The spacing-wheel 9 is moved step by step by any approved mechanism, such as ordinarily used in mortising-machines for revolving a single hub, and this mechanism is preferably operated from the driving-shaft $c$. A lever 10 is pivoted on the shaft E and carries a pivoted spring-pressed pawl 11, which engages with the notches of the spacing-wheel. A stop 12 is slidable in a guide 13 on the bracket D and engages with the notches of the spacing-wheel, and 14 is a spring for pressing the stop downward. The stop has a projection 15 with an inclined bottom, and 16 is a tappet which is pivoted to the lever 10. A spring 17 is provided for holding the tappet in its normal position. The tappet 16 is pivoted to lugs 40 on the hub 41 of the lever 10 by a pin 42 and is provided with a heel 43, which bears against the hub when the tappet is in its normal position and prevents it from moving on the pivot 42 away from the stop. Each time the rear end of the lever is raised the tappet raises the stop out of engagement with the notched spacing-wheel, and the pawl 11 then engages with the spacing-wheel and turns it around. The tappet passes beyond the projection on the stop while the spacing-wheel is being revolved, and the spacing-wheel cannot be moved too far forward because the stop drops into engagement with the spacing-wheel as soon as the next notch comes under the stop. The tappet turns on its pivot when the lever is moved in the reverse direction, so that the stop is not again raised. An adjustable rest 18 is provided for the rear end of the lever 10. A lever 20 is pivoted to the frame A and is operated by a tappet 21 on the driving-shaft $c$. A connecting-rod 22 is pivotally connected to the levers 10 and 20, so that the lever 10 is raised and caused to turn on its pivot periodically and when the saddle is in its lowest position. The lever is not turned on its pivot by the tappet when the saddle is raised and is not in its lowest position. By raising the lever 10 when the saddle is in its lowest position the hubs can all be revolved, as they are then clear of the boring-bit and the chisels. The notches in the spacing-wheel correspond with the number of mortises to be cut in each hub. The shaft E and the disks remain stationary until the hubs and the spacing-wheel have all been moved a complete revolution upon their axes.

J is a ratchet-wheel secured on the shaft E, and $j$ is a lever pivoted on the said shaft and provided with a pivoted spring-pressed pawl $j'$, which engages with the ratchet-wheel J.

K is a rest for the lever $j$, projecting from the saddle, and $k$ is a weight on the said lever for depressing it automatically. The lever $j$ can be operated by hand, if desired; but it is preferably operated automatically each time the spacing-wheel makes a complete revolution.

The disk F is provided with notches or teeth 24 on its periphery corresponding in number with the number of supports used. A stop 25 is slidable in a guide 26 and engages with the teeth or notches, so that the shaft E and its disks are normally prevented from being revolved by the weighted lever $j$. The stop 25 is pressed downward in any approved manner, as by gravity or by a spring. The stop 25 has a lug 27, which projects over the stop 12, and the spacing-wheel 9 has a projection 30 on its periphery between two of its notches. The stop 25 is not raised by the action of the tappet upon the stop 12, but when the projection 30 comes against the stop 12 in its raised position, which occurs once in each revolution of the spacing-wheel, it raises the stop 12 to an additional extent and causes it to lift the stop 25 out of engagement with the ratchet-tooth on the disk F. The weighted lever $j$ turns the shaft E when the stop 25 is raised, so that the hub which has had holes drilled all around its periphery by the boring-bit is removed from under the boring-bit and placed under the reciprocating chisels, which cut the round holes into mortises. The hub which has previously been operated on by the chisels is removed when at the front of the machine and another blank hub is inserted in its place, so that the action of the machine is continuous.

The weighted lever $j$ can be raised by hand periodically, if desired. In order to raise the lever $j$ automatically, a cord or other flexible connection $n$ is wound upon the hub $p$ of the lever $j$. One end of this cord is secured to the hub $p$, and its other end is secured to the floor or to a bracket $s$, projecting from the frame A. Each time the saddle is raised by its cam the cord is partly unwound from the hub of the lever and the free end of the lever is raised.

The disk F' is provided with a series of ratchet-teeth or notches 32, and 33 is a spring stop or pawl secured to the bracket D and engaging with the said ratchet-teeth. When the machine is at work, the pawl 33 holds the work-holding disks steady against the pressure of the boring-bit and together with the stop 25 prevents it from having any backlash.

What we claim is—

1. In a mortising-machine, the combination, with a pair of revoluble disks, and a series of revoluble supports for the hubs carried by the said disks; of driving mechanism for revolving the said supports simultaneously and step by step on their axes, automatic driving devices operating periodically to partially revolve the said disks on their axes, and tools operating on two hubs simultaneously, substantially as set forth.

2. In a mortising-machine, the combination, with mortise-cutting mechanism, and a reciprocatory work-holding device provided with supports for the hubs; of a retractable boring-bit arranged substantially parallel with the said mechanism, and a yieldable abutment which presses the boring-bit toward the work and permits it to be pushed back by the work when it fails to bore properly, substantially as set forth.

3. In a mortising-machine, the combination, with a frame, and a pair of disks journaled therein; of means for reciprocating the said frame and disks, a series of revoluble supports carried by the said disks, driving mechanism operating automatically to revolve the said supports upon their axes simultaneously and step by step each time the frame is reciprocated, and tools operating on two hubs simultaneously, substantially as set forth.

4. In a mortising-machine, the combination, with a revoluble work-holding device provided with a shaft, of a ratchet-wheel secured on the said shaft, a weighted operating-lever pivoted on the said shaft and provided with a pawl engaging with the said ratchet-wheel, and disengageable stop mechanism normally preventing the said shaft and work-holding device from being revolved by the said lever when same is raised relatively of the said shaft, said lever operating automatically to partially revolve the said shaft when the stop mechanism is disengaged, substantially as set forth.

5. In a mortising-machine, the combination, with a pair of revoluble disks, and a series of revoluble supports for the hubs carried by the said disks; of two independent ratchet mechanisms one of which is operatively connected with the said supports and revolves them step by step simultaneously and continuously, and the other of which is operatively connected with the said disks and partially revolves them, intermittently, and tools operating on two hubs simultaneously, substantially as set forth.

6. In a mortising-machine, the combination, with a revoluble work-holding device provided with two series of notches, a series of hub-supports carried by the said device, and a boring-tool arranged over the axis of one of the said hub-supports and to one side of the axis of the work-holding device; of a retractable stop which engages with one series of notches and normally prevents the said device from being revolved forward, means for turning the said device forward when released from the said stop, and an automatic spring-controlled stop which engages with the other series of notches and prevents the said device from being turned backward but permits it to be turned forward, substantially as set forth.

7. In a mortising-machine, the combination, with a boring-bit, and mortise-cutting mechanism arranged with their axes substantially parallel; of a revoluble work-holding device provided with revoluble supports for holding separate hubs on the respective axes of the said tools, means for turning the said supports on their own axes step by step, means for turning the work-holding device on its own axis step by step, and means for reciprocating the said work-holding device and its hub-supports longitudinally of the said tools, substantially as set forth.

8. In a mortising-machine, the combination, with a boring-bit, and mortise-cutting mechanism; of a revoluble work-holding device, a series of revoluble supports for the hubs carried by the said device, means for reciprocating the said work-holding device and its supports intermittently, driving mechanism for revolving the said supports simultaneously and step by step on their own axes, and means for revolving the said work-holding device step by step on its own axis, substantially as set forth.

9. In a mortising-machine, the combination, with a revoluble work-holder, and a series of revoluble supports for the hubs carried by the said work-holder; of driving mechanism operating to revolve the said supports simultaneously and step by step, automatic driving mechanism operating to turn the said work-holder a prearranged extent on its axis each time the said supports complete a revolution on their own axes, and tools operating on two hubs simultaneously, substantially as set forth.

10. In a mortising-machine, the combination, with a work-holder, a series of revoluble supports for the hubs carried by the said work-holder, and driving mechanism provided with a spacing-wheel and operating to revolve the said supports simultaneously; of a stop engaging with the said spacing-wheel and having a projection, an operating-lever pivoted concentric with the spacing-wheel, a tappet pivoted to the said lever and operating to strike the said projection and disengage the stop when moved in one direction and to turn on its pivot so as not to disengage the stop when moved in the reverse direction, a pawl pivoted to the said lever and operating to engage with and turn the spacing-wheel after the stop has been disengaged from it, and tools operating on two hubs simultaneously, substantially as set forth.

11. In a mortising-machine, the combination, with a revoluble work-holder provided with notches, a series of revoluble supports for the hubs carried by the said work-holder, and driving mechanism provided with a spacing-wheel and operating to revolve the said supports simultaneously; of a stop engaging with the said spacing-wheel and having a projection, a stop engaging with one of the notches in the work-holder and disengaged therefrom by the spacing-wheel stop when the latter is moved to a prearranged extent, an operating-lever pivoted concentric with the spacing-wheel, a tappet pivoted to the said lever and operating to strike the said projection and disengage the spacing-wheel stop, a pawl pivoted to the said lever and operating to turn the spacing-wheel when disengaged, a projection revolving with the spacing-wheel and operating to move the spacing-wheel stop to a prearranged additional extent periodically thereby disengaging the work-holder stop, and tools operating on two hubs simultaneously, substantially as set forth.

12. In a mortising-machine, the combination, with a work-holding device provided with a ratchet-wheel, and a pivoted and weighted operating-lever provided with a pawl which engages with the ratchet-wheel and turns it by gravity; of means for raising and lowering all the said parts bodily, and a flexible connection held stationary at one end and wound on and secured to the hub of the said lever, whereby said lever is raised pivotally each time it is raised bodily, substantially as set forth.

In testimony whereof we affix our signatures in presence of two witnesses.

LATHAM W. GREENLEAF.
GEORGE W. GREENLEAF.

Witnesses:
JAMES F. MURPHY,
FRANK S. MURPHY.